United States Patent
Huang et al.

(10) Patent No.: US 11,668,016 B2
(45) Date of Patent: Jun. 6, 2023

(54) ULTRA-THIN CARBON-LAYER COMPOSITE MATERIAL MODIFIED BY NICKEL NANOCLUSTERS AND VANADIUM CARBIDE PARTICLES AND ITS PREPARATION METHOD AND APPLICATION

(71) Applicant: SHAANXI UNIVERSITY OF SCIENCE & TECHNOLOGY, Shaanxi (CN)

(72) Inventors: Jianfeng Huang, Xi'an (CN); Qianqian Liu, Xi'an (CN); Liangliang Feng, Xi'an (CN); Liyun Cao, Xi'an (CN); Kang Li, Xi'an (CN)

(73) Assignee: SHAANXI UNIVERSITY OF SCIENCE & TECHNOLOGY, Shaanxi (CN)

( * ) Notice: Subject to any disclaimer, the term of this patent is extended or adjusted under 35 U.S.C. 154(b) by 0 days.

(21) Appl. No.: 17/380,716

(22) Filed: Jul. 20, 2021

(65) Prior Publication Data
US 2022/0025531 A1     Jan. 27, 2022

(30) Foreign Application Priority Data
Jul. 23, 2020    (CN) .......................... 202010717044.1

(51) Int. Cl.
*C25B 11/04*          (2021.01)
*C25B 1/04*           (2021.01)
*C25B 11/065*         (2021.01)
*C25B 11/091*         (2021.01)

(52) U.S. Cl.
CPC ................ *C25B 11/04* (2013.01); *C25B 1/04* (2013.01); *C25B 11/065* (2021.01); *C25B 11/091* (2021.01)

(58) Field of Classification Search
CPC ..... C25B 11/04; C25B 11/065; C25B 11/091; C25B 1/04
See application file for complete search history.

(56) References Cited

PUBLICATIONS

Peng et al., J. Mater. Chem. A, (2017), v.5, p. 23028-23034.*
Peng et al J Mater Chem A (2017) v5 p. 23028-23034_supplemental material.*
Peng et al., J. Mater. Chem. A, (2017), v.5, p. 23028-23034. (Provided previously).*

* cited by examiner

*Primary Examiner* — Yong L Chu
(74) *Attorney, Agent, or Firm* — Alleman Hall Creasman & Tuttle LLP

(57) ABSTRACT

The invention relates to an ultra-thin carbon-layer composite material modified by nickel nanoclusters and vanadium carbide particles, and its preparation method and application. The composite material comprises a two-dimensional ultra-thin carbon-layer as a matrix, in which nickel clusters and vanadium carbide nanoparticles are embedded to form coupling interfaces between Ni and C, VC and C, and Ni and VC. The thickness of the two-dimensional ultra-thin carbon-layer is less than 10 nm.

3 Claims, 4 Drawing Sheets

ULTRA-THIN CARBON-LAYER COMPOSITE MATERIAL MODIFIED BY NICKEL NANOCLUSTERS AND VANADIUM CARBIDE PARTICLES AND ITS PREPARATION METHOD AND APPLICATION

TECHNICAL FIELD

The invention relates to an ultra-thin carbon-layer composite material modified by nickel nanoclusters and vanadium carbide particles and a preparation method and application thereof, which involves the preparation and application of electrocatalyst materials.

BACKGROUND

"Energy crisis" and "environmental pollution" are two major problems pressing on human society, and people are urgently seeking a kind of clean and sustainable energy to alleviate these problems. Compared with fossil fuels, which may produce a lot of pollutants, hydrogen energy is considered as a new generation of clean and sustainable energy which can be used as a substitute for fossil fuels. As an efficient hydrogen production technology, people have high expectations for water splitting hydrogen production technology. To achieve a high conversion efficiency in a slow hydrogen evolution reaction, an electrocatalyst with a high activity and durability plays a leading part. Therefore, the challenge of the water splitting hydrogen production technology is to find a suitable electrocatalyst to reduce the activation energy of the hydrogen evolution reaction. Therefore, it is crucial to develop an efficient and low-cost electrocatalyst for hydrogen production based on the abundant elements in the earth.

VC has a similar density of d-bond electronic states with Pt, is rich in crust content and possesses an excellent hydrogen adsorption performance, etc., for which VC can be used as an appropriate electrocatalyst. However, the morphology of VC is uncontrollable, which limits the exposure of its active site, and the poor conductivity of metal carbides is bad for the electron transfer in the catalytic process, and all of these factors will lead to a decrease in catalytic activity.

Therefore, it has great theoretical and practical value to explore efficient and low-cost preparation method, via which more active sites of VC may be exposed, and good conductivity may be obtained, and then the catalytic activity and stability of VC may be improved.

SUMMARY

In view of the above-mentioned concerns, the invention aims to provide an ultra-thin carbon-layer composite material modified by nickel nanoclusters and vanadium carbide particles (which is referred to as a "Ni/VC@C composite material") and its preparation method and application. The method of the application has high repeatability and high productivity, which is suitable for a large-scale application. Furthermore, the resulting material has an excellent activity and stability at a full range of pH values.

In one aspect, the invention provides a carbon-layer composite material modified by nickel nanoclusters and vanadium carbide particles. The composite material comprises a two-dimensional carbon-layer as a matrix, in which the metallic nickel clusters and the vanadium carbide nanoparticles are embedded to form coupling interfaces between Ni and C, VC and C, and Ni and VC. The thickness of the two-dimensional carbon-layer is less than 10 nm.

According to the composite material provided by the application, the matrix is a two-dimensional carbon-layer, and the carbon-layer has a sufficiently thin thickness and a large specific surface area. Nickel nanoclusters and vanadium carbide particles are embedded in the ultra-thin carbon layer to form coupling interfaces, which can increase the number of reaction active sites of the material in the application.

In a preferred embodiment, the material in the invention is obtained by preparing NiV-LDH (nickel vanadium double metal hydroxide) precursor which provides both a nickel source and a vanadium source at the same time, which is then subjected to two-step calcination after mixing the precursor with a carbon source. Nickel ion in the precursor is reduced to metallic nickel, and carbon is used as a reductive agent here. Vanadium ions react with the carbon source to form ultra-small vanadium carbide particles. Therefore, the metallic nickel clusters and vanadium carbide nanoparticles of the materials provided by the invention have adjustable particle sizes and can be evenly dispersed in the carbon-layer, and the vanadium carbide nanoparticles have uniform morphology and high crystallinity. In addition, the presence of metallic nickel can catalyze the graphitization of part of the carbon in the reaction process, so that graphitized carbon can be formed around the metallic nickel clusters, and the presence of nickel metal and graphitized carbon can greatly improve the overall conductivity of the material.

In another optional embodiment, the carbon source can provide not only carbon but also nitrogen (such as when the carbon source is dicyandiamide), so that the final product is rich in nitrogen defects, and Ni—N bonds can be formed (the XPS spectrum of FIG. 2 shows that abundant Ni-Nx bonds exist). These factors are beneficial for improving the hydrogen evolution activity of the material.

In a preferred embodiment, the particle sizes of the nickel clusters and the vanadium carbide nanoparticles which are embedded in carbon-layer are adjustable between 3 to 15 nm. The material provided by the invention has a sufficiently thin thickness and a sufficiently large surface area, and the particle sizes of the metallic nickel clusters and vanadium carbide nanoparticles embedded in the carbon layer are small enough to evenly expose the active sites and improve the catalytic activity of the material.

In another aspect, the invention provides a preparation method of the above-mentioned composite material, comprises: (1) mixing a carbon source and a precursor (e.g. pretreated precursor of layered double hydroxide NiV-LDH) at a mass ratio of (2 to 4):1 to obtain a raw material mixture, and (2) putting the raw material mixture in an inert atmosphere, sintering at 500 to 550° C. for 1 to 2.5 hours, and then calcining at 800 to 900° C. for 1.5 to 2.5 hours, to obtain the composite material.

In the preparation method of the invention, the precursor can provide both the nickel source and the vanadium source at the same time. Based on the structural advantage of layered double hydroxides, nickel ion and vanadium ion are evenly distributed, being conducive to a uniform distribution of nickel metal and vanadium carbide in the product during the process of sintering.

Preferably, the carbon source is dicyandiamide. There is a high content of nitrogen atoms in this kind of carbon source, so that a nitrogen doped carbon can be obtained after calcination. The nitrogen doped carbon can improve the electronic structure of the material, thereby improving the catalytic activity of the material. In addition, the precursor providing both nickel and vanadium source at the same time is adopted. During a calcination process at 800 to 900° C., the nickel ion in the precursor is reduced to nickel metal at a high temperature while vanadium ion reacts with carbon source to form vanadium carbide particles. Metal nickel clusters and vanadium carbide particles are embedded in the carbon-layer to form plenty of coupling interfaces which together improve the composite catalytic activity of the catalyst.

In a preferred embodiment, wherein the precursor is obtained via a microwave hydrothermal reaction of an aqueous solution followed by an ultrasonic treatment, wherein the aqueous solution comprises a nickel source, a vanadium source, and an alkali source. A mole ratio of the nickel source, the vanadium source, and the alkali source is preferably (0.5 to 2):1:(1.5 to 1.6). The microwave hydrothermal is performed at a temperature of 90 to 110° C. and a power of 200 to 400 W for 2 to 4 hours. The ultrasonic treatment is performed at a temperature of 60 to 80° C. and a power of 180 to 200 W for 1 to 2 hours.

Also, preferably, the nickel source is selected from at least one of nickel nitrate hexahydrate, nickel sulfate hexahydrate and nickel chloride hexahydrate, and the vanadium source is vanadium chloride, and the alkali source is urea.

Preferably, the heating process comprises: sintering at 500 to 550° C. for 1 to 2.5 hours, and then calcining at 800 to 900° C. for 1.5 to 2.5 hours. A proper heat treatment can control the thickness of carbon layer, the extent of epitaxial growth of carbon layer, as well as the crystallization degree and particle size of nanoparticles. If the heating time is too long, the carbon layer will stack and agglomerate, and it is bad for the formation of phase if the heating time is too short. More preferably, the heating process comprises the following steps: firstly, heating from room temperature to 500 to 550° C. at a heating rate of 3 to 5° C./min and holding for 1.5 to 2 hours; then heating to 800 to 900° C. at a heating rate of 3 to 5° C./min and calcining for 1.5 to 2.5 hours; then cooling to 300° C. at a cooling rate of 8 to 10° C./min; and finally, naturally cooling to room temperature.

In another aspect, the invention also provides an application of the composite material in electrocatalytic hydrogen evolution. In the invention, metallic nickel clusters and vanadium carbide particles are evenly distributed as active sites in the ultra-thin carbon layer of the composite material. In addition to the active sites provided by metallic nickel clusters and vanadium carbide particles, coupling interfaces are formed between the metallic nickel cluster and vanadium carbide particle, which together improve the catalytic activity. Furthermore, the presence of metallic nickel clusters can catalyze the graphitization of the disordered carbon layer around it to form an ordered structure, which can improve the overall conductivity of the composite material. Moreover, compared to a one-dimensional carbon nanotube structure, a two-dimensional carbon-layer structure has a greater active area which can expose more active sites. For the above factors, the hydrogen evolution activity of the material is finally improved.

Beneficial Effect

In the invention, compared to the traditional hydrothermal method, the microwave hydrothermal method has a significant improvement in the preparation of nickel vanadium double metal hydroxide with a shorter reaction period and a lower reaction temperature, so that the process period is greatly shortened and the reaction cost is reduced, which is conducive to large-scale production of the material. Secondly, the ultrasonic treatment in absolute ethanol can make nickel vanadium double metal hydroxide peel off layer by layer to form a single layer or few layers of nickel vanadium layered double hydroxide ultra-thin nano sheets (the precursor), which is conducive to the subsequent calcination reaction to achieve the purpose of full reaction. At this time, the precursor has an ultra-thin lamellar structure (the thickness is less than 3 nm). Based on this, the nickel ions and vanadium ions in the precursor are evenly distributed and can fully contact with the carbon source to react during the calcination process, the interval between them can regulate the particle sizes of metallic nickel clusters and vanadium carbide particles in the product, and the distribution of metallic nickel and vanadium carbide nanoparticles in the carbon layer is uniform. The reaction condition of the above-mentioned preparation process which are inter-phase mutual restriction and mutual influence can ensure the particular morphology of the product of the invention.

Due to the presence of metallic nickel, disordered carbon can form partial ordered structure via catalytic graphitization, and the order degree of carbon around the nickel clusters embedded in the ultra-thin carbon-layer can be improved, thus improving the overall conductivity of the composite material and further increasing the charge transfer rate of the material in the test process.

In the invention, the sizes of vanadium carbide nanoparticles and metallic nickel clusters are controllable.

In the invention, besides being used as a carbon source, dicyandiamide also provides nitrogen, so that the final product is nitrogen doped carbon, and nitrogen doping can reduce the reaction barrier; secondly, Ni-Nx bond can be formed in the material, which is conducive to improve the hydrogen evolution activity of the material.

In the invention, there are a lot of coupling interfaces formed between metallic nickel clusters and carbon-layer, vanadium carbide nanoparticles and carbon-layer, metallic nickel clusters and vanadium carbide nanoparticles, which not only increase the active area of the material, but also improve the electronic interaction of the whole material, so as to jointly improve the overall hydrogen evolution performance of the material.

In the invention, the obtained ultra-thin carbon-layer composite material modified by nickel nanoclusters and vanadium carbide particles can be used for hydrogen evolution testing at a full range of pH values, and have both excellent catalytic activity and stability.

DETAILED DESCRIPTION

Figure 1:
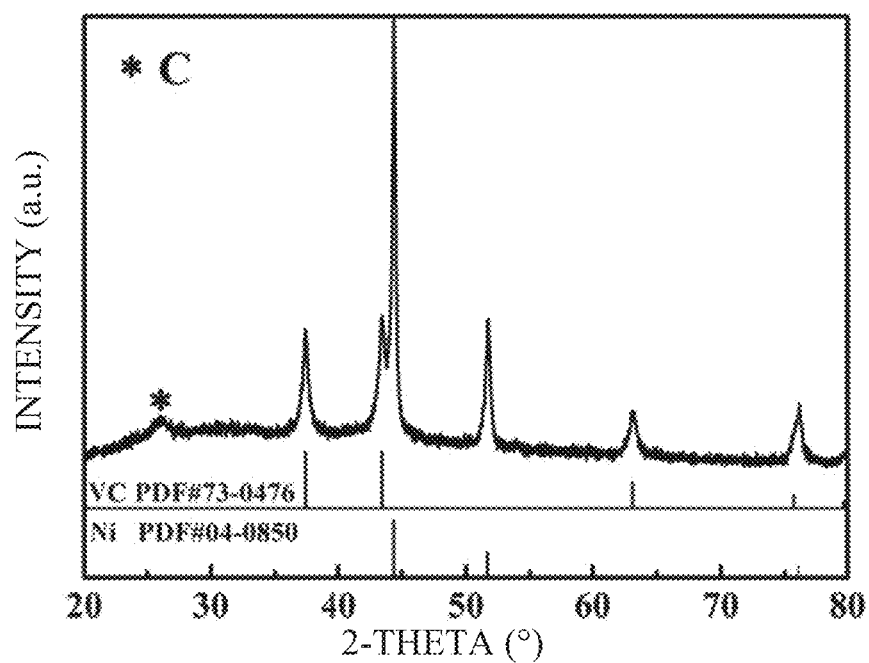
FIG. 1 is an X-ray spectrum of the Ni/VC@C composite material prepared in example 2.

Hereinafter, the present invention will be further described with the following examples. It should be understood that the following examples are used to explain this invention and do not mean to limit the scope of this invention.

In the present invention, an ultra-thin carbon-layer composite material modified by nickel nanoclusters and vanadium carbide particles comprises a two-dimensional ultra-thin carbon which has been partially graphitized, and metallic nickel clusters and vanadium carbide particles with controllable particle sizes embedded in the ultra-thin carbon layer. In an optional embodiment, the vanadium carbide nanoparticles have a particle size of about 3 to 15 nm, a uniform morphology, a high crystallinity, and good dispersion. The particle size of the nickel clusters is about 3 to 15 nm. Metallic nickel clusters and vanadium carbide nanoparticles are distributed uniformly in the ultra-thin carbon layer, which work together to improve the electrocatalytic hydrogen evolution performance of the ultra-thin carbon layer.

The following is an exemplarily description of the preparation method of an ultra-thin carbon-layer composite material modified by nickel nanoclusters and vanadium carbide particles provided by the present invention.

Preparation of nickel vanadium double metal hydroxide: A nickel source, a vanadium source, and an alkali source are mixed with a solution, which then undergo a microwave hydrothermal reaction at 90 to 110° C., to obtain nickel vanadium double metal hydroxide. The nickel source is selected from nickel nitrate hexahydrate, nickel sulfate hexahydrate, or nickel chloride hexahydrate, etc. The vanadium source is vanadium chloride, etc. The alkali source is urea. The mole ratio of the nickel source, the vanadium source, and the alkali source is (0.5 to 2):1:(1.5 to 1.6). The microwave hydrothermal reaction continues for 2 to 4 hours at a power of 200 to 400 W.

Preparation of a precursor A: The resulting nickel vanadium double metal hydroxide is treated with ultrasonic processing for 1 to 2 hours in an ethanol solution at a temperature of 60 to 80° C. and a power of 180 to 200 W, which is then dried at room temperature to produce pretreated double metal hydroxide, referred as the precursor A.

An example of the preparation of nickel vanadium double metal hydroxide comprises the following steps: nickel chloride hexahydrate, vanadium chloride and urea are mixed at the specified mole ratio, and then are added to 20 to 25 ml ultra-pure water under stirring for 10 to 15 minutes, to obtain solution A. The mixed solution A is put into a microwave apparatus to react for 2 to 4 hours at a temperature of 90 to 110° C. and a power of 200 to 400 W, and the reaction mixture is then cooled down to room temperature. Finally, the product is cleaned with ultra-pure water and absolute ethanol for 2 to 3 times respectively, and then dried for 4 to 5 hours in a vacuum drying oven to give the nickel vanadium double metal hydroxide.

The nickel vanadium double metal hydroxide is treated with ultrasonic processing for 1 to 2 hours in an ethanol solution at a temperature of 60 to 80° C. and a power of 180 to 200 W, which is dried at room temperature to finally give the precursor A.

A carbon source and the precursor A are mixed and ground thoroughly to give a mixture of raw material. The carbon source is dicyandiamide and the ratio of the carbon source and the precursor A is (2 to 4):1. The grinding may continue 20 to 30 minutes.

The mixture of raw material is put into a container (such as a crucible or a combustion boat), which is then put into a tube furnace under an argon atmosphere while the ventilation continues for 30 to 40 minutes. Firstly, it is heated from room temperature at a heating rate of 3 to 5° C./min to 500 to 550° C. which is maintained for 1 to 2 hours, and then heated to 800 to 900° C. from 500 to 550° C. at a heating rate of 3 to 5° C./min for sintering. After sintering, it is cooled to 300° C. from 800 to 900° C. at a cooling rate of 10° C./min, then cooled down naturally to room temperature, to give a black powder which is an ultra-thin carbon-layer composite material modified by nickel nanoclusters and vanadium carbide particles (Ni/VC@C composite material).

Hereinafter, the present invention will be further described with the following examples. It should be understood that the following examples are used to explain this invention and do not mean to limit the scope of this invention. Any non-essential improvements and modifications made by a person skilled in the art based on this invention all fall into the protection scope of this invention. The specific process parameters below are only exemplary and are not restricted to the specific values shown below, that is a person skilled in the art can choose proper values within an appropriate range according to the description.

Example 1

Nickel chloride hexahydrate, vanadium chloride and urea were mixed at a mole ratio of 0.5:1:1.56, and then added into 25 mL ultra-pure water and stirred for 15 minutes, to obtain solution A. The mixed solution A was put into a microwave apparatus to react for 4 hours at a temperature of 110° C. and a powder of 400 W, which was then cooled down to room temperature, cleaned by ultra-pure water and absolute ethanol for 3 times respectively, and then dried for 5 hours in a vacuum drying oven, to give a nickel vanadium double metal hydroxide.

The nickel vanadium double metal hydroxide was treated with ultrasonic processing for 2 hours in an ethanol solution at a temperature of 60° C. and a power of 180 W, and then dried at room temperature to give precursor A.

Dicyandiamide and the precursor A were mixed at a mass ratio of 2:1 and ground thoroughly for 30 minutes, to give a mixture of raw material.

The mixture of raw material was put into a combustion boat, which was then put into a tube furnace under an argon atmosphere while the ventilation continued for 30 minutes. After that, it was heated from room temperature at a heating rate of 5° C./min to 500° C. which was maintained for 2 hours, and then heated from 500° C. at a heating rate of 5° C./min to 800° C. which was maintained for 2 hours. After that, it was cooled down to 300° C. from 800° C. at a cooling rate of 10° C./min, and then to room temperature via natural cooling, to give a black powder which is an ultra-thin carbon-layer composite material modified by nickel nanoclusters and vanadium carbide particles (Ni/VC@C composite material).

Figure 3:
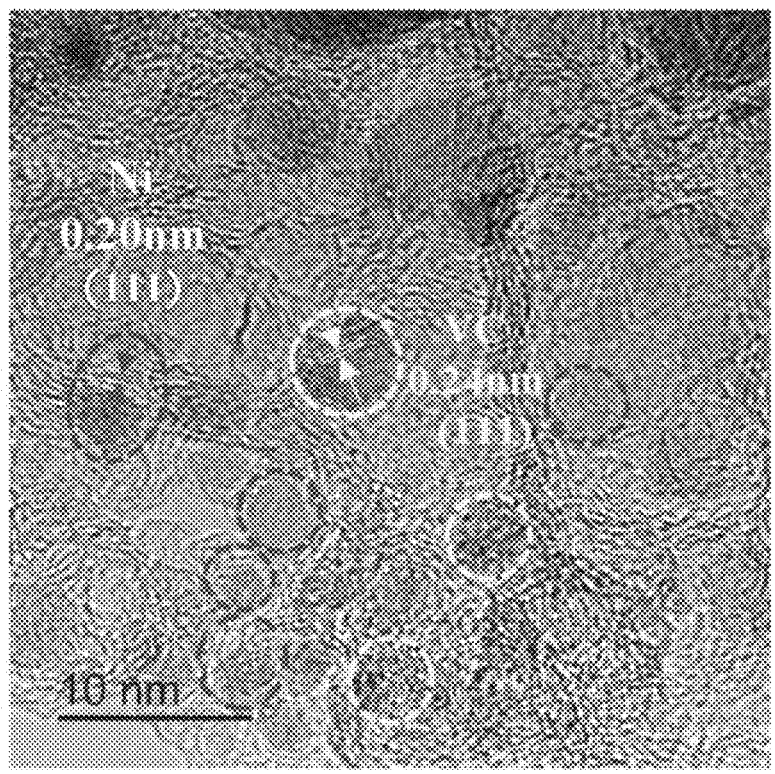
FIG. 3 is a transmission electron microscope image of the Ni/VC@C composite material prepared in example 1.

As shown in FIG. 3, a transmission electron microscope image of the Ni/VC@C composite material obtained from example 1, the sample has a structure that vanadium carbide particles and nickel clusters are embedded in the ultra-thin carbon layer, and the thickness of the ultra-thin carbon layer is less than 10 nm. The metallic nickel clusters have a size of 3 to 8 nm (referring to the gray elliptical (or circular)

dotted line in the figure, while the exposed crystal face of metal nickel is (111) crystal face, and the corresponding lattice pitch is 0.20 nm), vanadium carbide nanoparticles have a size of 3 to 5 nm (refer to the white elliptical (or circular) dotted line in the figure, while the exposed crystal face of vanadium carbide is (111) crystal face, and the corresponding lattice spacing is 0.24 nm).

Example 2

Nickel chloride hexahydrate, vanadium chloride, and urea were mixed at a mole ratio of 1:1:1.56 and then added into 25 mL ultra-pure water and stirred for 15 minutes, to obtain solution A. The mixed solution A was put into a microwave apparatus to react for 4 hours at a temperature of 110° C. and a power of 400 W, which was then cooled down to room temperature, cleaned by ultra-pure water and absolute ethanol for 3 times respectively, and then dried for 5 hours in a vacuum drying oven, to give a nickel vanadium double metal hydroxide.

The nickel vanadium double metal hydroxide was treated with ultrasonic processing for 2 hours in an ethanol solution at a temperature of 60° C. and a power of 180 W, and then dried at room temperature to give precursor A.

Dicyandiamide and precursor A were mixed at a mass ratio of 4:1 and ground thoroughly for 30 minutes, to give a mixture of raw material.

The mixture of raw material was put into a combustion boat, which was then put into a tube furnace under an argon atmosphere while the ventilation continued for 40 minutes. After that, it was heated from room temperature at a heating rate of 4° C./min to 500° C. which was maintained for 2 hours, and then heated from 500° C. at a heating rate of 4° C./min to 800° C. which was maintained for 2 hours. After that, it was cooled down to 300° C. from 800° C. at a cooling rate of 10° C./min, and then to room temperature via natural cooling, to give a black powder which is an ultra-thin carbon-layer composite material modified by nickel nanoclusters and vanadium carbide particles (Ni/VC@C composite material).

Figure 2:
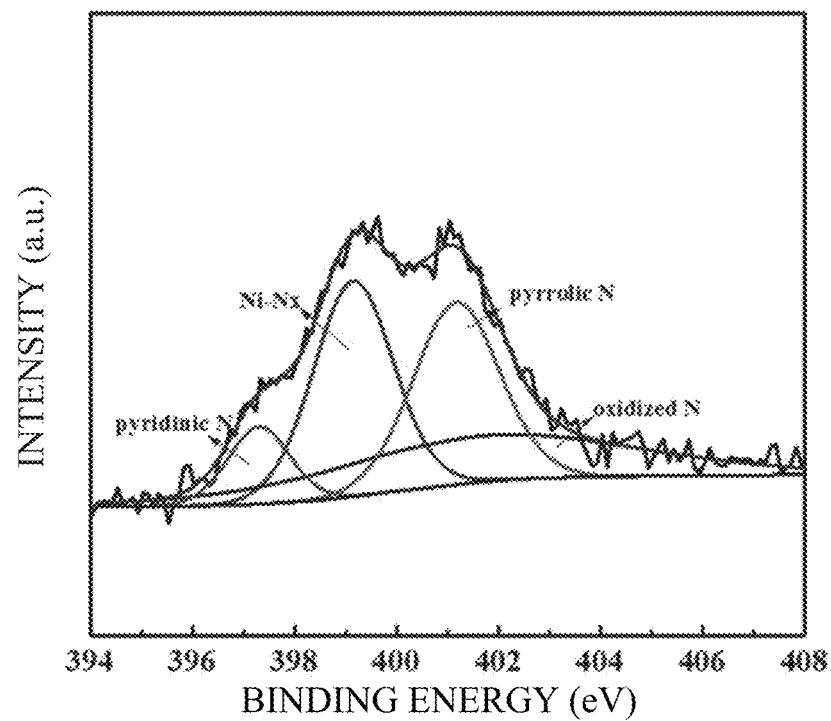
FIG. 2 is an XPS spectrum of the nitrogen in the composite material prepared in example 1.
Figure 4:
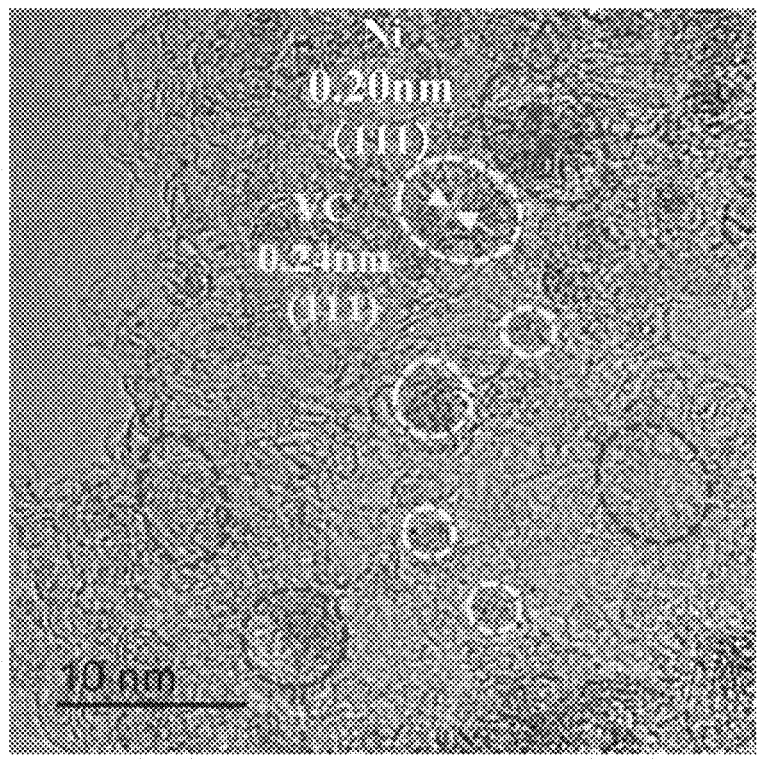
FIG. 4 is a transmission electron microscope image of the Ni/VC@C composite material prepared in example 2.
Figure 6:
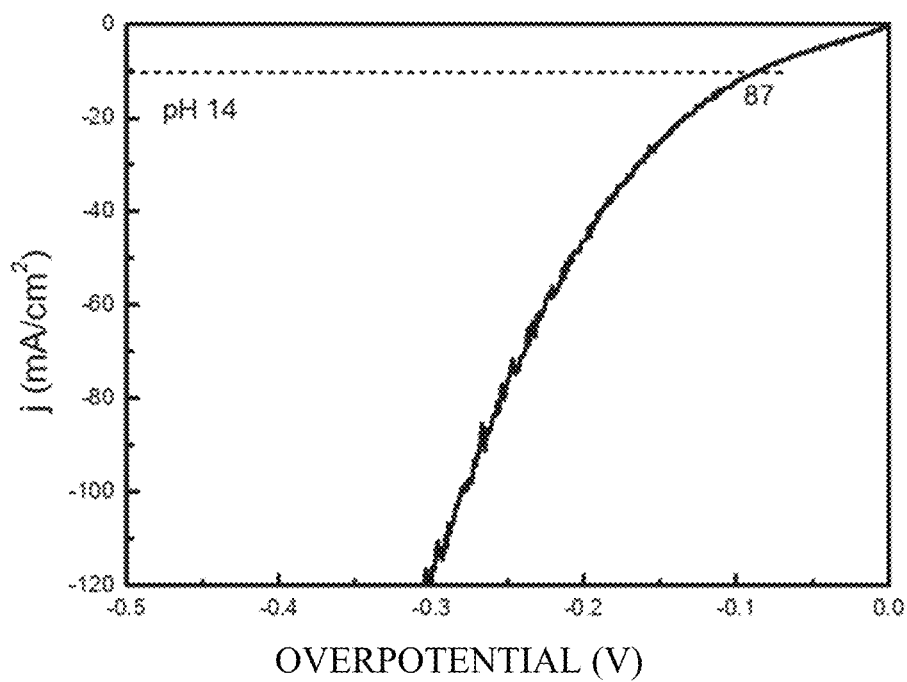
FIG. 6 is a HER performance graph of the Ni/VC@C composite material prepared in example 2 under alkaline conditions.
Figure 7:
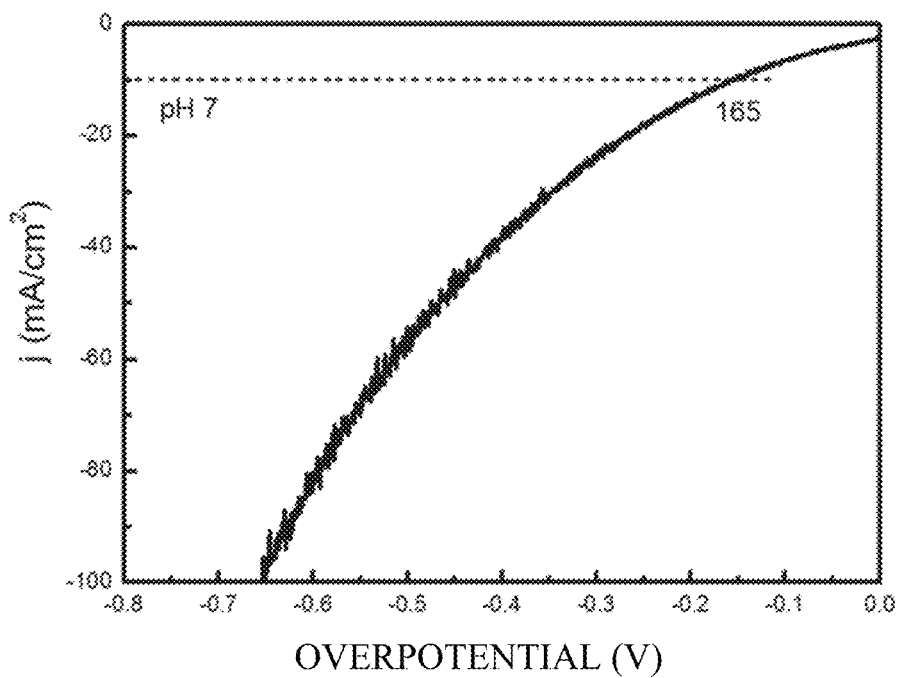
FIG. 7 is a HER performance graph of the Ni/VC@C composite material prepared in example 3 under acidic conditions.
Figure 8:
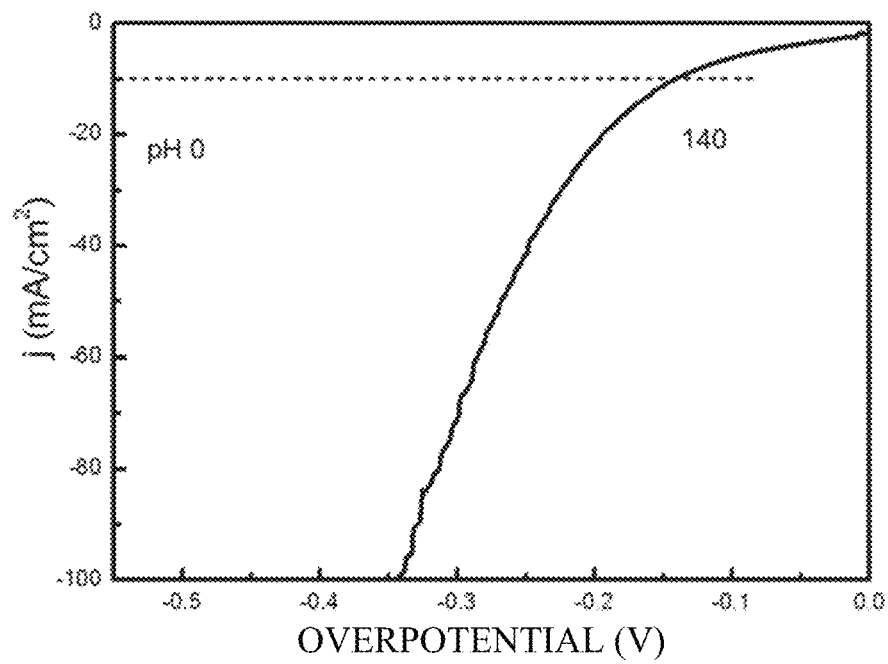
FIG. 8 is a HER performance graph of the Ni/VC@C composite material prepared in example 1 under neutral conditions.

As shown in FIG. 1, diffraction peaks of x-rays of the Ni/VC@C composite material obtained from Example 2 at 37.2°, 43.4°, 63.2° and 76.1° are totally matched with the crystal face of (111), (200), (220), and (311) of VC (JCPDS No. 73-0476) respectively, the diffraction peaks at 44.5° and 51.8° are the characteristic diffraction peaks of metallic nickel, and the diffraction peak at 24.6° is consistent with that of graphite carbon. These features indicate that vanadium carbide, nickel and graphitized carbon exist in the product. As shown in an X-ray photoelectron spectroscopy of N element represented in FIG. 2, the Ni/VC@C composite material obtained from example 2 has four forms of nitrogen: pyridinic N, pyrrolic N, oxidized N and Ni—NX bond. The presence of the Ni—NX bond can improve the hydrogen evolution activity of the samples. As shown in FIG. 4, a transmission electron microscope image of the Ni/VC@C composite material obtained from Example 2, the sample has a structure in which vanadium carbide particles and metallic nickel clusters are embedded in the ultra-thin carbon layer, and the thickness of the ultra-thin carbon layer is less than 10 nm. The metallic nickel clusters have a size of 6 to 10 nm (referring to the gray elliptical (or circular) dotted line in the figure, while the exposed crystal face of nickel is (111) crystal face, and the corresponding lattice pitch is 0.20 nm), and the vanadium carbide nanoparticles have a size of 3 to 8 nm (refer to the white elliptical (or circular) dotted line in the figure, while the exposed crystal face of vanadium carbide is (111) crystal face, and the corresponding lattice spacing is 0.24 nm). As shown in FIG. 6, the Ni/VC@C composite material obtained from Example 2 has a good electrocatalytic hydrogen evolution performance in 1 M KOH solution, and its overpotential is about 87 mV when the current density is 10 mA/cm$^2$. As shown in FIG. 7, the Ni/VC@C composite material obtained from example 3 has a good electrocatalytic hydrogen evolution performance in 1 M PBS solution, and its overpotential is about 165 mV when the current density is 10 mA/cm$^2$. As shown in FIG. 8, the Ni/VC@C composite material obtained from example 1 has a good electrocatalytic hydrogen evolution performance in 0.5 M H$_2$SO$_4$ solution, and its overpotential is about 140 mV when the current density is 10 mA/cm$^2$. Under circumstances with the same current density, the lower the overpotential is, the better the activity is, so it can be seen that the samples obtained from the application have excellent electrocatalytic hydrogen production performance at a full range of pH values (0 to 14).

Example 3

Nickel chloride hexahydrate, vanadium chloride and urea were mixed at a mole ratio of 1.5:1:1.56 and then added in 25 mL ultra-pure water and stirred for 15 minutes, to obtain solution A. The mixed solution A was put into a microwave apparatus to react for 4 hours at a temperature of 110° C. and a power of 400 W, which was then cooled down to room temperature, cleaned by ultra-pure water and absolute ethanol for 3 times respectively, and then dried for 5 hours in a vacuum drying oven, to give a nickel vanadium double metal hydroxide.

The nickel vanadium double metal hydroxide was treated with ultrasonic processing for 2 hours in an ethanol solution at a temperature of 60° C. and a power of 180 W, and then dried at room temperature to give precursor A.

Dicyandiamide and precursor A were mixed at a mass ratio of 3:1 and ground thoroughly for 30 minutes, to give a mixture of raw material.

The mixture of raw material was put into a combustion boat, which was then put into a tube furnace under an argon atmosphere while the ventilation continued for 40 minutes. After that it was heated from room temperature at a heating rate of 5° C./min to 500° C. which was maintained for 2 hours, and heated from 500° C. at a heating rate of 5° C./min to 800° C. which was maintained for 2 hours. After that it was cooled down to 300° C. from 800° C. at a cooling rate of 10° C./min, and then to room temperature via natural cooling, to give a black powder which is an ultra-thin carbon-layer composite material modified by nickel nanoclusters and vanadium carbide particles (Ni/VC@C composite material). In the composite material, the thickness of the ultra-thin carbon layer is less than 10 nm, the nickel clusters have a size of 6 to 8 nm, and the vanadium carbide nanoparticles have a size of 3 to 5 nm.

Example 4

Nickel chloride hexahydrate, vanadium chloride, and urea were mixed at a mole ratio of 2:1:1.56 and then added into 25 mL ultra-pure water and stirred for 15 minutes, to obtain solution A. The mixed solution A was put into a microwave apparatus to react for 4 hours at a temperature of 110° C. and a power of 300 W which was then cooled down to room temperature, cleaned by ultra-pure water and absolute ethanol for 3 times respectively, and then dried for 5 hours in a vacuum drying oven, to give a nickel vanadium double metal hydroxide.

The nickel vanadium double metal hydroxide was treated with ultrasonic processing for 2 hours in an ethanol solution at a temperature of 70° C. and a power of 200 W, and then dried at room temperature to give the precursor A.

Dicyandiamide and the precursor A were mixed at a mass ratio of 4:1 and ground thoroughly for 30 minutes, to give a mixture of raw material.

Figure 5:
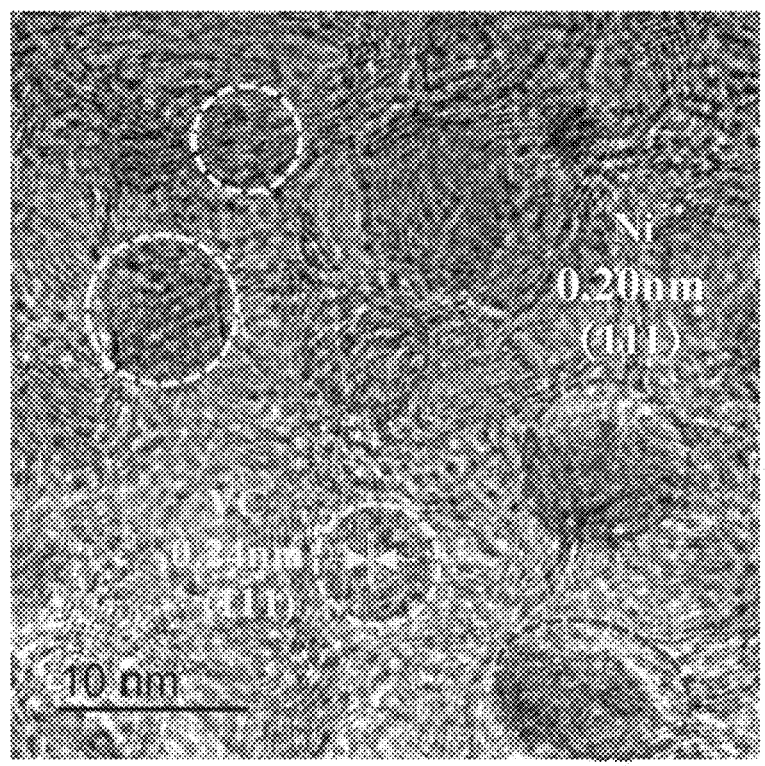
FIG. 5 is a transmission electron microscope image of the Ni/VC@C composite material prepared in example 4.

The mixture of raw material was put into a combustion boat, which was then put into a tube furnace under an argon atmosphere while the ventilation continued for 40 minutes. After that, it was heated from room temperature at a heating rate of 5° C./min to 500° C. which was maintained for 2 hours, and then heated from 500° C. at a heating rate of 5° C./min to 800° C. which was maintained for 2 hours. After that, it was cooled down to 300° C. from 800° C. at a cooling rate of 10° C./min, and then to room temperature via natural cooling, to give a black powder which is an ultra-thin carbon-layer composite material modified by nickel nanoclusters and vanadium carbide particles (Ni/VC@C composite material). As shown in FIG. 5, a transmission electron microscope image of the Ni/VC@C composite material obtained from Example 4, the sample has a structure that vanadium carbide particle and metallic nickel cluster were embedded in the ultra-thin carbon layer, and the thickness of the ultra-thin carbon layer is less than 10 nm. The metallic nickel clusters have a size of 8 to 10 nm (referring to the gray elliptical (or circular) dotted line in the figure, at while the exposed crystal face of nickel is (111) crystal face, and the corresponding lattice pitch is 0.20 nm), and the vanadium carbides have a size of 3 to 8 nm (refer to the white elliptical (or circular) dotted line in the figure, at this time, the exposed crystal face of vanadium carbide is (111) crystal face, and the corresponding lattice spacing is 0.24 nm).

Example 5

Nickel chloride hexahydrate, vanadium chloride and urea were mixed at a mole ratio of 1:1:1.56 and then added into 25 mL ultra-pure water and stirred for 15 minutes, to obtain solution A. The mixed solution A was put into a microwave apparatus to react for 4 hours at a temperature of 110° C. and a power of 400 W, which was then cooled down to room temperature, cleaned by ultra-pure water and absolute ethanol for 3 times respectively, and then dried for 5 hours in a vacuum drying oven, to give a nickel vanadium double metal hydroxide.

The nickel vanadium double metal hydroxide was treated with ultrasonic processing for 2 hours in an ethanol solution at a temperature of 80° C. and a power of 190 W, and then dried at room temperature, to give the precursor A.

Dicyandiamide and the precursor A were mixed at a mass ratio of 4:1 and ground thoroughly for 30 minutes, to a mixture of raw material.

The mixture of raw material was put into a combustion boat, which was then put into a tube furnace with ultrasonic processing for 30 minutes. After that, it was heated from room temperature at a heating rate of 5° C./min to 500° C. which was maintained for 2 hours, and then heated from 500° C. at a heating rate of 5° C./min to 900° C. which was maintained for 2 hours. After that, it was cooled down to 300° C. from 900° C. at a cooling rate of 10° C./min, and then to room temperature via natural cooling, to give a black powder which is an ultra-thin carbon-layer composite material modified by nickel nanoclusters and vanadium carbide particles (Ni/VC@C composite material). In the composite material, the thickness of the ultra-thin carbon layer is less than 10 nm, and the nickel clusters have a size of 8 to 12 nm, and the vanadium carbide nanoparticles have a size of 6 to 8 nm.

The embodiments given above are preferred examples for implementing the present invention, and the present invention is not limited to the above embodiments. Any non-essential additions and substitutions made by those skilled in the art based on the technical features of the technical solution of the present invention belong to the protection scope of the present invention.

The invention claimed is:

1. A preparation method of a carbon-layer composite material modified by nickel nanoclusters and vanadium carbide particles, comprising:
   (1) mixing a carbon source and a precursor at a mass ratio of (2 to 4):1 to obtain a raw material mixture; and
   (2) putting the raw material mixture in an inert atmosphere, heating at 500 to 550° C. for 1 to 2.5 hours, and then heating at 800 to 900° C. for 1.5 to 2.5 hours, to obtain the composite material,
   wherein the precursor is obtained via microwave hydrothermal reaction of an aqueous solution followed by an ultrasonic treatment,
   wherein the aqueous solution comprises a nickel source, a vanadium source, and an alkali source, and
   wherein a mole ratio of the nickel source, the vanadium source, and the alkali source is (0.5 to 2):1:(1.5 to 1.6).

2. The preparation method of claim 1,
   wherein the nickel source is selected from at least one of nickel nitrate hexahydrate, nickel sulfate hexahydrate, and nickel chloride hexahydrate, and
   wherein the vanadium source is vanadium chloride, and the alkali source is urea.

3. The preparation method of claim 1, wherein the heating process comprises:
   heating from room temperature at a heating rate of 3 to 5° C./min to 500 to 550° C. which is maintained for 1.5 to 2 hours;
   heating to 800 to 900° C. at a heating rate of 3 to 5° C./min and calcining for 1.5 to 2.5 hours; and
   cooling to 300° C. at a cooling rate of 8 to 10° C./min, and then to room temperature via natural cooling.

* * * * *